(12) United States Patent
Madia

(10) Patent No.: US 11,520,039 B2
(45) Date of Patent: Dec. 6, 2022

(54) RADAR SYSTEM WITH FREQUENCY DIVISION TRANSMITTERS AND RECEIVERS

(71) Applicant: FINCANTIERI SPA, Trieste (IT)

(72) Inventor: Francesco Madia, Trieste (IT)

(73) Assignee: FINCANTIERI SPA, Trieste (IT)

( * ) Notice: Subject to any disclaimer, the term of this patent is extended or adjusted under 35 U.S.C. 154(b) by 654 days.

(21) Appl. No.: 16/342,723

(22) PCT Filed: Sep. 27, 2017

(86) PCT No.: PCT/IB2017/055883
§ 371 (c)(1),
(2) Date: Apr. 17, 2019

(87) PCT Pub. No.: WO2018/073676
PCT Pub. Date: Apr. 26, 2018

(65) Prior Publication Data
US 2019/0293788 A1    Sep. 26, 2019

(30) Foreign Application Priority Data
Oct. 17, 2016  (IT) .................. 102016000103880

(51) Int. Cl.
*G01S 7/03* (2006.01)
*G01S 13/00* (2006.01)
(Continued)

(52) U.S. Cl.
CPC .............. *G01S 13/937* (2020.01); *G01S 7/03* (2013.01); *G01S 13/003* (2013.01);
(Continued)

(58) Field of Classification Search
CPC .... G01S 13/937; G01S 13/003; G01S 13/426; G01S 13/88; G01S 13/06
See application file for complete search history.

(56) References Cited

U.S. PATENT DOCUMENTS

2010/0066590 A1* 3/2010 Brown ................. G01S 13/42
342/147
2010/0164784 A1* 7/2010 Longstaff ............ H01Q 21/08
342/202
(Continued)

FOREIGN PATENT DOCUMENTS

JP         06249945 A    9/1994
WO      2015104728 A1    7/2015
WO   WO-2015104728 A1 * 7/2015 ........... G01S 13/003

OTHER PUBLICATIONS

International Search Report for corresponding application PCT/IB2017/055883 filed Sep. 27, 2017; dated Jan. 16, 2018.
(Continued)

*Primary Examiner* — Donald H B Braswell
(74) *Attorney, Agent, or Firm* — Cantor Colburn LLP

(57) ABSTRACT

A radar system having a transmitting antenna including a plurality of linear arrays of transmitting antenna elements arranged on a generatrix of a truncated cone or on a cylindrical surface; a signal generator block operatively connected to the transmitting antenna and adapted to feed the transmitting antenna; a receiving antenna having a plurality of groups of linear arrays of receiving antenna elements arranged on the generatrix of the truncated cone or on the cylindrical surface, in which each group of linear arrays of receiving antenna elements is circumferentially interposed between a first and a second linear array of transmitting antenna elements; a signal processor operatively connected to the receiving antenna, where the signal generator block is adapted and configured to feed the transmitting antenna so that the first and the second linear arrays of transmitting antenna elements emit a first and a second electromagnetic radiation, respectively, at a first and a second frequencies different from each other.

12 Claims, 4 Drawing Sheets

(51) Int. Cl.
  *G01S 13/42* (2006.01)
  *H01Q 1/34* (2006.01)
  *H01Q 21/30* (2006.01)
  *G01S 13/937* (2020.01)
  *H01Q 21/20* (2006.01)
  *G01S 13/88* (2006.01)
  *H01Q 3/24* (2006.01)

(52) U.S. Cl.
  CPC ............ *G01S 13/426* (2013.01); *G01S 13/88* (2013.01); *H01Q 1/34* (2013.01); *H01Q 3/242* (2013.01); *H01Q 21/205* (2013.01); *H01Q 21/30* (2013.01)

(56) References Cited

U.S. PATENT DOCUMENTS

| | | | | |
|---|---|---|---|---|
| 2010/0328157 A1* | 12/2010 | Culkin | ................. | H01Q 21/061 |
| | | | | 342/372 |
| 2016/0061948 A1* | 3/2016 | Ton | ........................ | G01S 13/90 |
| | | | | 342/22 |
| 2017/0230916 A1* | 8/2017 | Stein | ........................ | H04B 1/69 |

OTHER PUBLICATIONS

Written Opinion of the International Searching Authority for corresponding application PCT/IB2017/055883 filed Sep. 27, 2017; dated Jan. 16, 2018.

* cited by examiner

RADAR SYSTEM WITH FREQUENCY DIVISION TRANSMITTERS AND RECEIVERS

TECHNICAL FIELD

The present disclosure relates to the technical field of radar systems.

BACKGROUND

It is known to equip land vehicles or ships, e.g. military ships, with radar systems which allow monitoring the surrounding space in order to identify possible threats. Radar systems are also used for land surveillance, for example in airports or for surveilling sensitive targets.

The aforesaid radar systems have undergone a long evolution over time. In order to have a 360° scan of the radar beam in the azimuthal plane, radar systems initially were developed comprising a voluminous reflective antenna, typically installed on a rotating platform provided on board the vehicle. The aforesaid radar systems then evolved over time up to the more modern radar systems which do not provide rotating platforms and which, in order to obtain as wide a visibility as possible on the azimuthal plane, take advantage of a plurality of planar active phased array antennas. For example, radar systems are known which provide four planar active phased array antennas, each installed on a face of a ship mast substantially shaped like a truncated pyramid with a quadrangular base.

Due to the ability to quickly change the direction of the beam in a controlled manner, active phased array radar systems allow a vehicle, such as a military ship, to use a single radar system for detecting and monitoring surfaces (for example for identifying ships), monitoring air space (for identifying airplanes and missiles), guiding missiles, controlling artillery devices.

Planar active phased array radars of the prior art so far installed on board vehicles such as military ships are typically monostatic radars because each array antenna consists of a plurality of both receiving and transmitting modules (TX/RX modules), each of which is sequentially converted over time between the two operating methods, transmitting and receiving, respectively. For this reason, the aforesaid phased array radar systems of the prior art are particularly costly. It is also worth noting that in the configuration in which there are provided four planar active phased array antennas, each installed on a face of a ship mast substantially shaped as a truncated pyramid with a quadrangular base, such radar systems do not have uniform performances over the whole azimuthal plane because such performances are degraded in particular in the directions arranged in front of the corners of the truncated pyramid. In other words, the aforesaid radar systems of the known art have scanning losses in the horizontal plane.

A known radar system having a conical geometrical shape is described in document JP H06249945 A. Such a document discloses a radar system with TX/RX modules, in which there are analog phase shifters in the receiving chain for tracking the receiving beams. For this reason, such a radar system does not implement a receiving full digital beamforming or a digital beamforming. The antenna is also divided into axially spaced horizontal truncated conical sections, each of which operates at a respective frequency. Such a radar system has the serious drawback of not allowing the formation of multiple independent beams and does not allow controlling the amplitude on the surface of the truncated cone, thereby generating beams with high side lobes.

International Patent Application WO2015/104728A1 describes a bistatic radar system in which the transmitting antenna has a cylindrical or conical geometry and comprises an array of columns of active transmitting modules. The receiving antenna has a conical geometry and comprises an array of columns of receiving modules. The transmitting antenna is axially spaced from the receiving antenna.

Although the radar system described in WO2015/104728A1 overcomes the drawbacks of the above-indicated prior art, the need is felt to make a radar system which is structurally less complex and less costly than the radar system described in WO2015/104728A1.

BRIEF SUMMARY

The present description provides a radar system which has as uniform performances as possible in the azimuthal plane and a less complex and less costly structure than the one of the radar system described in WO2015/104728A1.

BRIEF DESCRIPTION OF THE DRAWINGS

The disclosure will be better understood from the following detailed description of embodiments thereof, given by way of example and therefore non-limiting in any manner in relation to the accompanying drawings, in which.

Equal or similar elements are indicated with the same numerals in the accompanying figures.

DETAILED DESCRIPTION

The figures show a preferred but non-limiting embodiment of a radar system 1 comprising a transmitting antenna and a receiving antenna. In the particular example depicted, and without any limitation, the radar system 1 is a radar of a military boat, e.g. a military ship. It is however to be noted that the teachings of the present description can be applied without limitations to the particular field of use of the radar system 1. Indeed, the radar system 1 can be used for example, also in the fields of telecommunications, civil boating, scientific measuring instruments.

The radar system 1 is, for example, an X band radar system and is such as to transmit signals at a carrier frequency ranging between 9 GHz and 11 GHz, for example equal to 10 GHz. The bandwidth of the radar system 1, in baseband or at intermediate frequency, ranges for example between 30 MHz and 60 MHz, and is for example, equal to 40 MHz.

Figure 2:
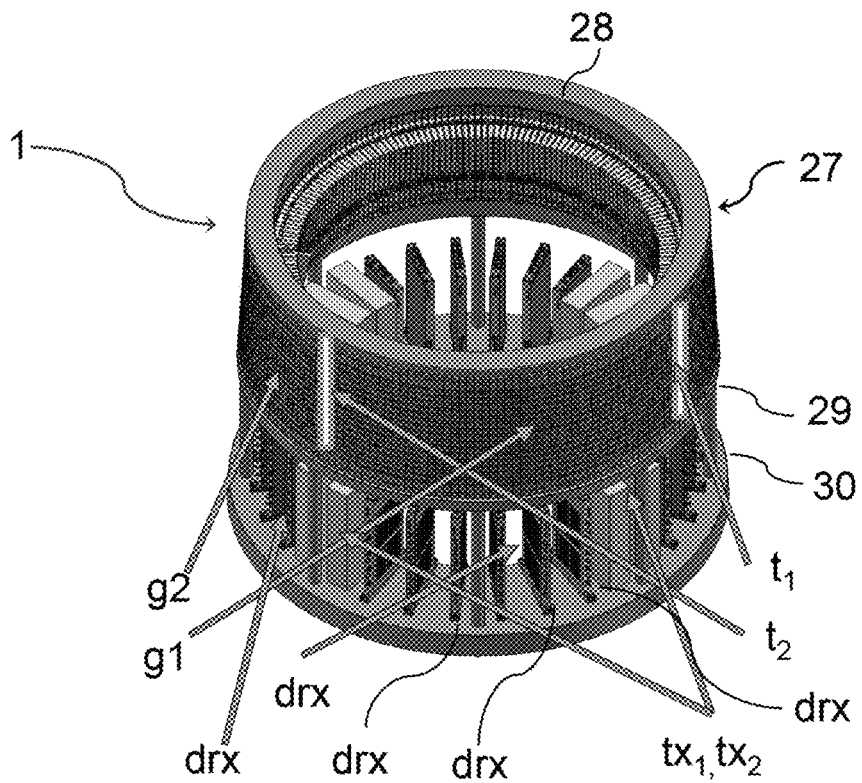
FIG. 2 shows a three-dimensional view of a possible embodiment of a part of the system in FIG. 1.
Figure 4:
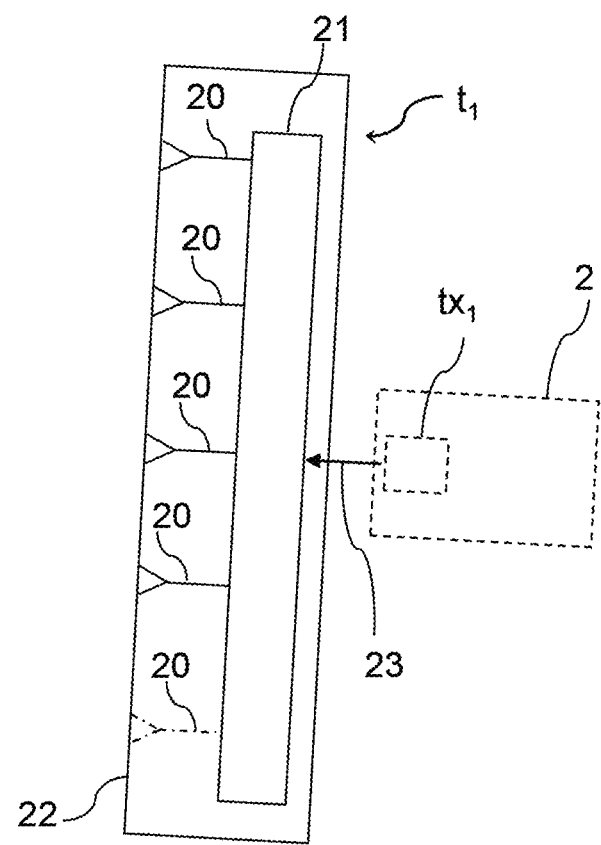
FIG. 4 shows a simplified diagram of an embodiment of linear array of transmitting antenna elements of the transmitting antenna of the radar system in FIG. 1.

The radar system 1 comprises a transmitting antenna comprising a plurality of linear arrays $t_1$-$t_4$ of transmitting antenna elements 20 arranged on a generatrix of a truncated cone or on a cylindrical surface. In the particular example depicted in FIGS. 2 and 4, the transmitting antenna elements 20 shown in FIG. 4 are arranged on a generatrix of a truncated cone. According to a preferred embodiment, the aforesaid truncated cone has a solid angle of opening ranging between 5° and 20°, ends included. For example, such a solid angle of opening is equal to, or approximately equal to, 8°.

Figure 3:
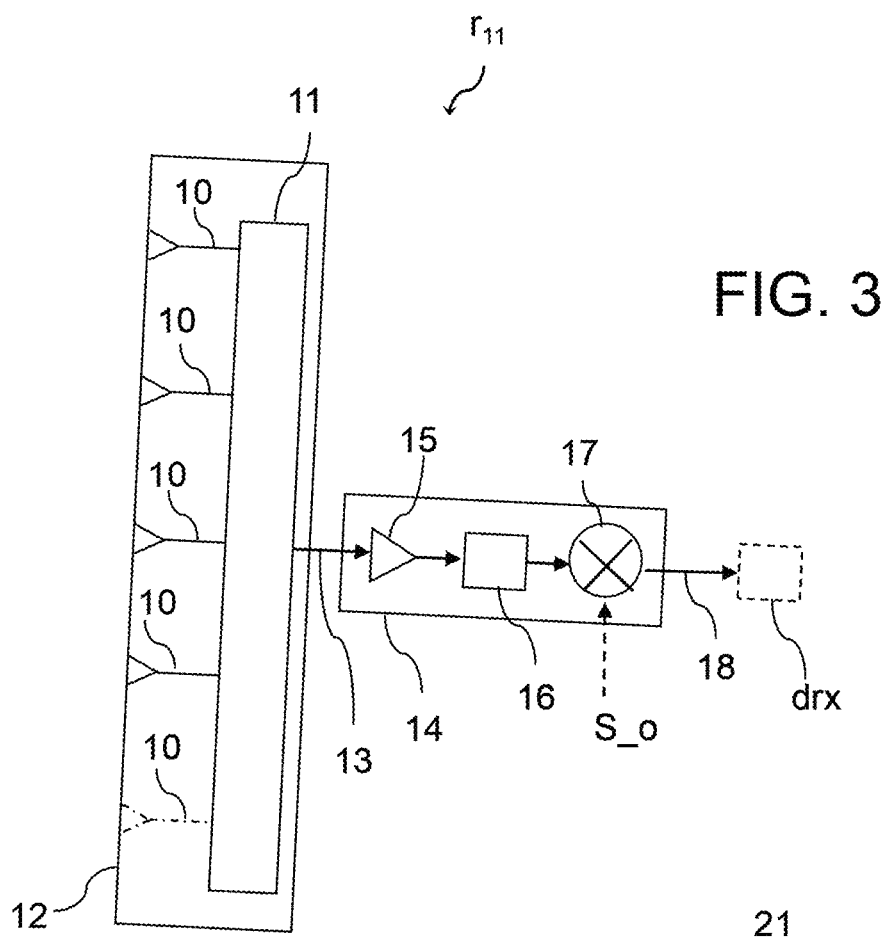
FIG. 3 shows a simplified diagram of an embodiment of linear array of receiving antenna elements of the receiving antenna of the radar system in FIG. 1.

The radar system 1 comprises a receiving antenna comprising a plurality of groups g1-g4 of linear arrays of $r_{11}$-$r_{1n}$, . . . , $r_{41}$-$r_{4n}$ of receiving antenna elements 10 arranged on the generatrix of the truncated cone or on the cylindrical surface, in which each group g1-g4 of linear arrays $r_{11}$-$r_{1n}$, . . . , $r_{41}$-$r_{4n}$ of receiving antenna elements 10 is circumferentially interposed between a first and a second linear array of transmitting antenna elements 20. In the particular example depicted in FIGS. 2 and 3, the receiving antenna elements 10 shown in FIG. 3 are arranged on the generatrix of the truncated cone on which the transmitting antenna elements 20 are also arranged.

The radar system 1 further comprises a signal generator block 2 operatively connected to the transmitting antenna and adapted to feed the transmitting antenna, in particular each of the linear arrays $t_1$-$t_4$ of transmitting antenna elements.

The signal generator block 2 is adapted and configured to feed the transmitting antenna so that the first and the second linear arrays of transmitting antenna elements emit, preferably simultaneously, a first and a second electromagnetic radiation, respectively, at a first and a second frequencies different from each other. Said first and second electromagnetic radiations have a beam with an opening angle limited in the azimuthal plane, for example equal to 90° or approximately equal to 90°. Angle of opening means an angle in which the amplitude of the beam substantially is uniform. The aforesaid frequencies preferably are spaced from each other by a distance ranging between 5 MHz and 15 MHz and for example, equal to 10 MHz.

Figure 1:
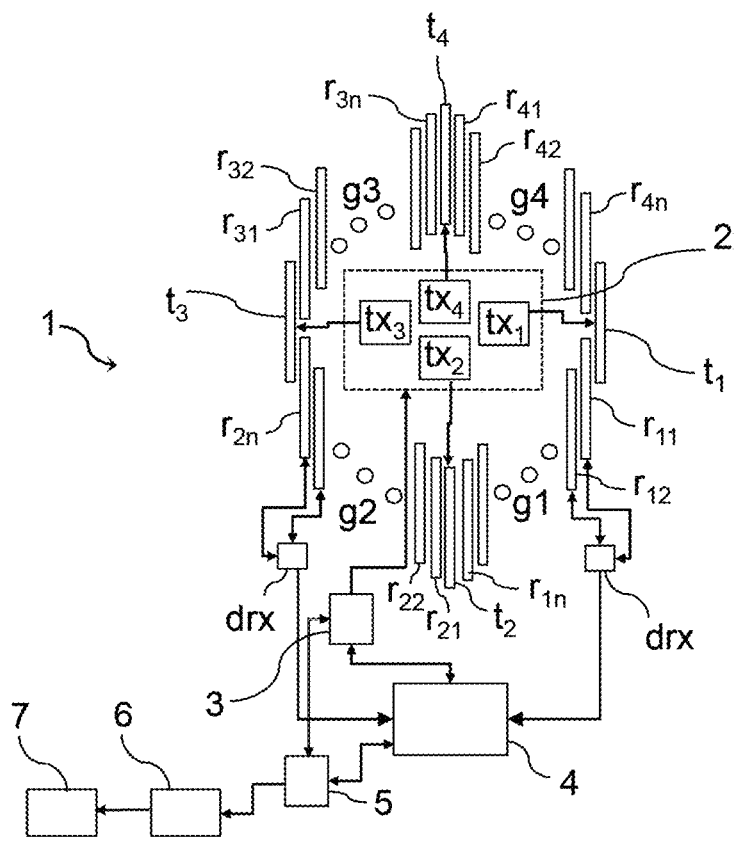
FIG. 1 shows a functional block diagram of an embodiment of a radar system comprising a transmitting antenna and a receiving antenna.

Preferably, as in the example depicted in FIG. 1, the transmitting antenna comprises four linear arrays $t_1$-$t_4$ of transmitting antenna elements 20 oriented two by two along opposite directions and arranged in diametrically opposite positions from one another. For example, the linear arrays $t_1$-$t_4$ of transmitting antenna elements 20 which are arranged in diametrically opposite positions emit electromagnetic radiations at a same frequency. For example, the linear arrays $t_1$, $t_3$ of the transmitting antenna emit radiations at a same frequency f1, while the linear arrays emit electromagnetic radiations $t_2$, $t_4$ at a same frequency f2 which is different from frequency f1. In an alternative embodiment, in any case it may be provided for the linear arrays $t_1$-$t_4$ of the transmitting antenna to emit electromagnetic radiations having all different frequencies from one another. Moreover, in the particular example depicted, the signal generator block 2 comprises a plurality of independent transmission modules $tx_1$-$tx_4$ each operatively connected to a respective linear array $t_1$-$t_4$ of the transmitting antenna. In an alternative embodiment, in any case it may be provided for a transmission module $tx_1$-$tx_4$ to be operatively connected to a plurality of linear arrays of the transmitting antenna.

In the particular example depicted, the receiving antenna comprises four groups of linear arrays of receiving antenna elements, indicated with g1, g2, g3, g4 respectively. The linear arrays $r_{11}$-$r_{1n}$ of receiving antenna elements of group g1 are adjacent to one another and together form a group g1 of arrays interposed between the linear array $t_1$ of transmitting antenna elements and the linear array $t_2$ of transmitting antenna elements. The linear arrays $r_{21}$-$r_{2n}$ of group g2 are adjacent to one another and together form a group g2 of arrays interposed between the linear array $t_2$ of transmitting antenna elements and the linear array $t_3$ of transmitting antenna elements and so on, for the remaining two groups g3, g4 of arrays of the example depicted in the figures.

According to a preferred embodiment, if there are four linear arrays $t_1$-$t_4$ of transmitting antenna elements, the aforesaid arrays are angularly spaced, two by two, by 90°.

According to a possible non-limiting embodiment, the number of linear arrays forming the receiving antenna is much greater than the number of linear arrays $t_1$-$t_4$ forming the transmitting antenna. For example, the transmitting antenna comprises four linear arrays $t_1$-$t_4$ of transmitting antenna elements. For example, each of the aforesaid linear arrays $t_1$-$t_4$ comprises eight or sixteen transmitting antenna elements. It is apparent that by increasing or decreasing the number of transmitting antenna elements in a same linear array, the amplitude in elevation of the beams transmitted decreases or increases. In this example, the receiving antenna comprises two-hundred and sixteen linear arrays of receiving antenna elements, for example also each linear array in the receiving antenna comprises eight or sixteen receiving antenna elements.

According to a preferred and non-limiting embodiment, the linear arrays of the receiving antenna and/or of the transmitting antenna comprise antenna elements which are waveguide radiating elements as described in general, or according to particular embodiments, in International Patent Application WO2016128886 A1 herein incorporated in its entirety for reference.

Preferably, each of the linear arrays both of the transmitting antenna and of the receiving antenna is a modular block which is physically independent from the others, which is fixed inside a support structure 27 comprising two circular plates or, as in the example depicted, two rings 28, 29. Such rings 28, 29 are axially spaced from each other and for example, fixed to each other by means of a plurality of spacer elements, for example by means of a plurality of vertical columns. According to one embodiment, the aforesaid support structure 27 is at least partly covered with a radome (not shown in the figures) overlapping and preferably in contact with the receiving and transmitting antenna elements, and which is conveniently made of a material adapted to act as a bandpass filter for the portion of frequency spectrum involved. For example, the radome is made of Kevlar or glass fiber, and is shaped like a truncated cone. Preferably, the radome extends axially between the two rings 28, 29.

FIG. 3 shows a general block diagram of one of the linear arrays of the receiving antenna, in the example, the linear array $r_{11}$. The remaining linear arrays of the receiving antenna are completely identical or similar. Such a linear array $r_{11}$ comprises a plurality of receiving antenna elements 10 arranged in a housing structure 12. The linear array $r_{11}$ comprises a waveguide power coupler 11 having a plurality of input ports, each connected to a respective receiving antenna element 10 and having a waveguide output port 13. The output port 13 preferably is connected to a frequency down-conversion analog module 14, adapted to convert a radiofrequency radar echo signal captured by the linear array $r_{11}$ into frequency, for example to bring it to an intermediate frequency. Such an intermediate frequency is for example, equal to or approximately equal to 1 GHz. In the example, the frequency down-conversion module 14 comprises, in sequence, an analog amplifier 15, e.g. an LNA 15, a filter 16 and a mixer 17. The frequency down-conversion analog module 14 is adapted to and configured for supplying a radar echo analog output signal at intermediate frequency. To perform the conversion at intermediate frequency, mixer 17 receives a STALO (stable local oscillator) input signal S_o. For example, such a signal S_o is identical for each of the conversion modules 14 associated with the different linear arrays of the receiving antenna and is supplied to such modules by the signal generator block 2.

The frequency down-conversion module 14 may be housed in the housing structure 12 or may be arranged outside such a structure 12, in a dedicated container arranged as close as possible to such a structure 12, for example directly fixed thereto.

FIG. 4 shows a general block diagram of one of the linear arrays of the transmitting antenna, in the example the linear array $t_1$. The remaining linear arrays of the transmitting antenna are completely identical or similar. Such a linear array $t_1$ comprises a plurality of transmitting antenna elements 20 arranged in a housing structure 22. The linear array $t_1$ comprises a waveguide power divider 21 having a plurality of output ports, each connected to a respective transmitting antenna element 20 and having a waveguide input port 23. The input port 23 is connected to the signal generator 2, and in particular to the transmission module $tx_1$. With reference to FIGS. 3 and 4, it is worth noting that advantageously in terms of structure, the waveguide part of the linear arrays of the transmitting antenna, that is the antenna elements 20 and divider 21, may be identical or completely similar to the waveguide part, that is the antenna elements 10 and coupler 21, of the linear arrays of the receiving antenna. The same holds true for the housing structure 12, 22.

The radar system 1 further comprises a radar echo signal processor drx, 4 operatively connected to the receiving antenna, in particular connected to each of the linear arrays of receiving antenna elements. The radar echo signal processor drx, 4 preferably comprises a plurality of digital processing modules drx. If such digital processing modules drx are single channel modules, there is provided a dedicated digital processing module drx for each linear array of the receiving antenna. If such digital processing modules drx instead are multichannel modules, several linear arrays of the receiving antenna may be associated, for example four or eight, with a single multichannel digital processing module. Here, the processing of the radar echo signals conveniently occurs in parallel on the different channels.

According to a preferred embodiment, the digital processing modules drx are fixed to a support and fastening structure 30 which is axially spaced with respect to the linear arrays of the transmitting antenna and of the receiving antenna. Such a structure 30 is for example a disc- or ring-shaped structure.

According to an advantageous embodiment, the radar echo signal processor drx, 4 comprises a full digital beamforming block 4 operatively connected to the receiving antenna and suitable for and configured to digitally synthesize a plurality of simultaneous and independent receiving beams. In the example, such a full digital beamforming block 4 is connected to the digital processing modules drx. Advantageously, each receiving beam is synthesized by processing radar echo signals received by a plurality of linear arrays of receiving antenna elements consecutive to one another. For example, if a receiving beam is to have an amplitude of 2° in the azimuthal plane, and in the hypothesis of using two-hundred and sixteen linear arrays for the receiving antenna, each receiving beam is synthesized by processing the radar echo signals supplied by seventy-two linear arrays of the receiving antenna.

According to one embodiment, for the synthesis of at least one of said receiving beams, the linear arrays consecutive to one another of the receiving antenna belong to two distinct groups g1-g4 of linear arrays of the receiving antenna. For example, refer to FIG. 5, which shows a diagram of polar radiation in the azimuthal plane showing the four beams $b\_t_1$-$b\_t_4$ transmitted by the four linear arrays $t_1$-$t_4$ of the transmitting antenna, each having an amplitude of 90°, and one-hundred and eighty receiving beams to be synthesized if receiving beams are to be obtained with an amplitude of 2°. Three of such receiving beams are marked with $b\_r_{12}$, $b\_r_{17}$, $b\_r_{1n}$. The receiving beam $b\_r_{12}$ is centered on the linear array $r_{12}$ of the receiving antenna. To obtain such a receiving beam $b\_r_{12}$, there may be used for example, a given number of linear arrays of the receiving antenna arranged on opposite sides with respect to the linear array $r_{12}$, for example, thirty-six linear arrays arranged on one side and thirty-six linear arrays arranged on the opposite side. It is apparent thereby that radar echo signals are used to synthesize the receiving beam $b\_r_{12}$ which are captured by linear arrays of the receiving antenna belonging both to group g1 and to group g2. According to a possible embodiment, to have even more uniform performances in the azimuthal plane, a circulator may be associated with the linear arrays $t_1$-$t_4$ of the transmitting antenna so as to use the few linear arrays $t_1$-$t_4$ of the transmitting antenna, here four, also as additional linear arrays of the receiving antenna. In any case, it is worth noting how such a solution in terms of hardware is much less complex with respect to solutions of the known art which provide planar phased array antennas with Tx/Rx modules, that is antennas in which all the transmitting antenna elements are also receiving antenna elements.

Figure 5:
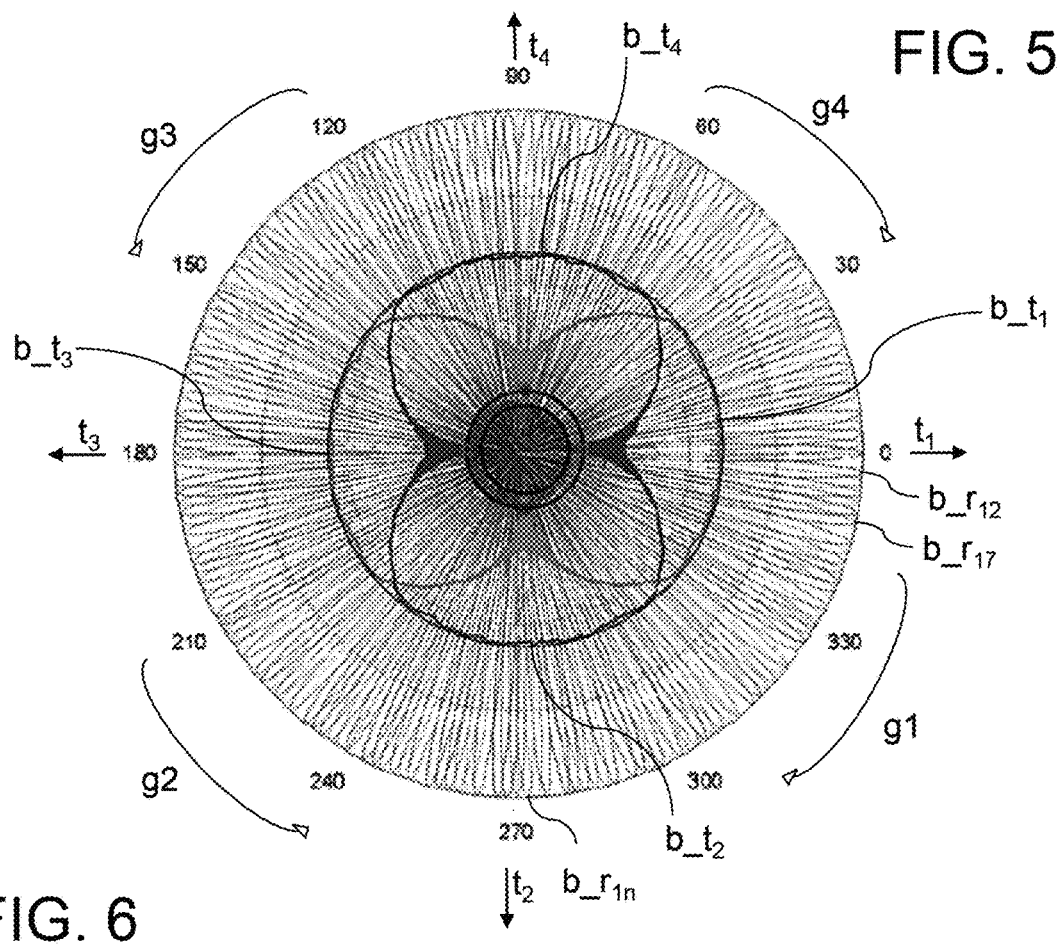
FIG. 5 shows a polar diagram, obtained by means of experimental tests, representing the transmitting beams and receiving beams of the antennas of the radar system of FIGS. 1 and 2, on an azimuthal plane.
Figure 6:
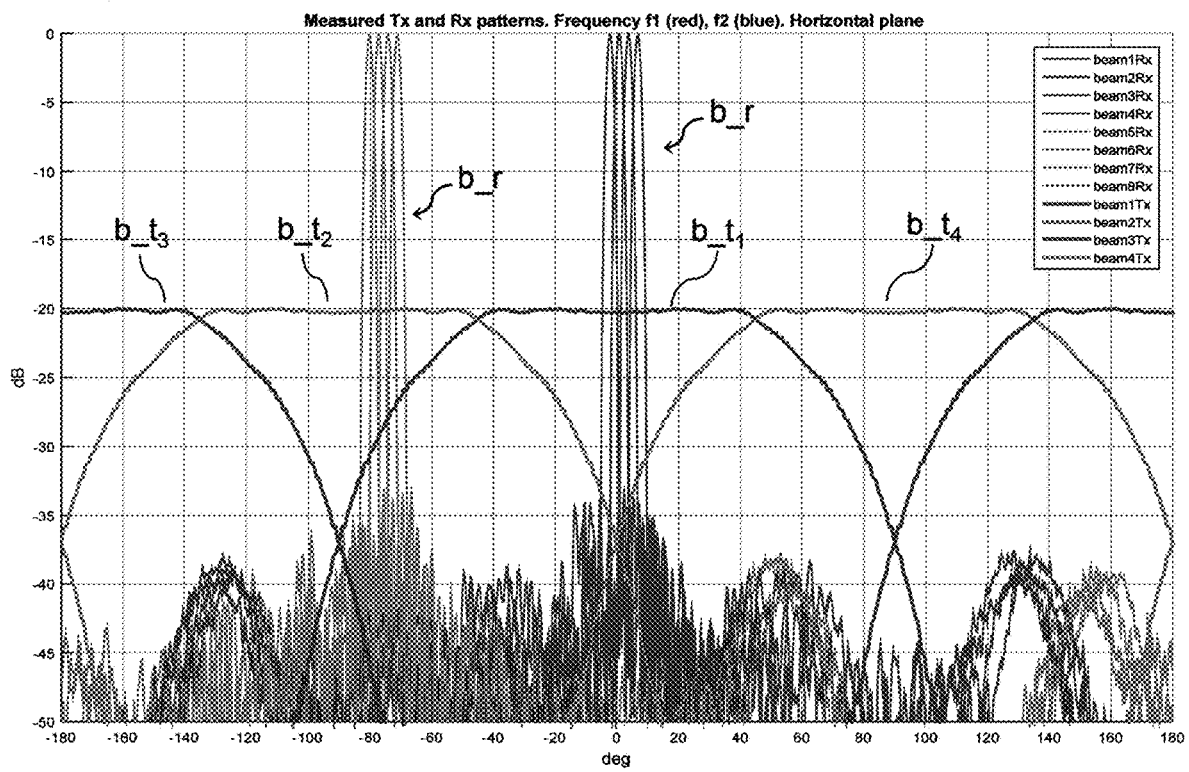
FIG. 6 shows a diagram, obtained by means of experimental tests, representing the transmitting beams and certain receiving beams of the antennas of the radar system of FIGS. 1 and 2.

FIG. 6 is very similar to FIG. 5 and differs from it due to the format of the graph; here, the graph is a Cartesian graph and not a polar graph, and in that there are shown only two groups of digitally synthesized receiving beams b_r.

According to one embodiment, the linear arrays of the receiving antenna are adapted and configured to receive radar echo signals resulting from the reflection on a target of both said first and said second electromagnetic radiations. The radar echo signal processor is adapted and configured:
  to sample said received radar echo signals to obtain digital signals;
  to carry out a digital filtering which allows a set of digital samples containing information related to pulses transmitted by the first linear array of transmitting antenna elements and a set of digital samples containing information related to pulses transmitted by the second linear array of transmitting antenna elements, to be extracted from said digital signals.

The aforesaid digital samples are transmitted to the full digital beamforming block 4 via the synthesis of the receiving beams.

The aforesaid sampling and filtering operations are for example performed by the digital processing modules drx. The aforesaid digital filtering is for example a FIR filtering.

Preferably, if the linear arrays of the receiving antenna comprise a frequency down-conversion module 14 adapted to convert the received radar echo signals into intermediate frequency analog signals, as described above, the aforesaid digital processing module drx is such as to sample the aforesaid intermediate frequency analog signals.

The radar system 1 preferably comprises a block 3 for scheduling radar activities adapted to control the signal generator block 2 and the radar echo signal processor drx, 4.

As explained above, the full digital beamforming block 4 is adapted to receive in input and to numerically process the digital samples obtained from radar echo signals received by the receiving antenna. In particular, such a block 4 comprises a digital processor which, by receiving input weight coefficients W, is configured and adapted to calculate various weighted linear combinations of the aforesaid digital samples.

According to one embodiment, the radar system 1 comprises a radar signal digital processor 6 operatively connected to scheduler 3 and to the full digital beamforming block 4, and adapted to provide the latter with the weight coefficients W and to receive the weighed input linear combinations calculated. All linear combinations correspond to a receiving antenna beam. The number of pulses and transmission timing are scheduled by means of the scheduler block 3 according to the radar activity underway, which is automatically updated according to processing operations of the radar signal digital processor 5.

In addition to the radar signal digital processor 5, the radar system 1 may be provided to also comprise a data processor 6 operatively connected to the signal processor 5, and a command and control console 7 operatively connected to the data processor 6.

Figure 7:
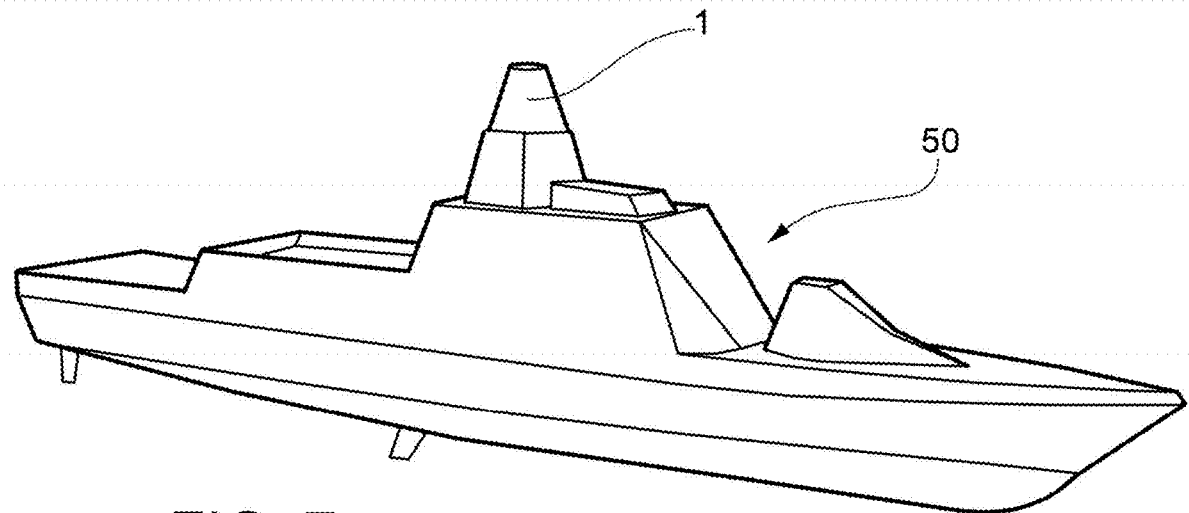
FIG. 7 shows a boat comprising the radar system of FIGS. 1 and 2.

With reference to the example depicted in FIG. 7, the above-described radar system 1 may be installed on board a boat 70, such as for example a ship, preferably it may be installed on a mechanically stabilized platform.

Figure 8:
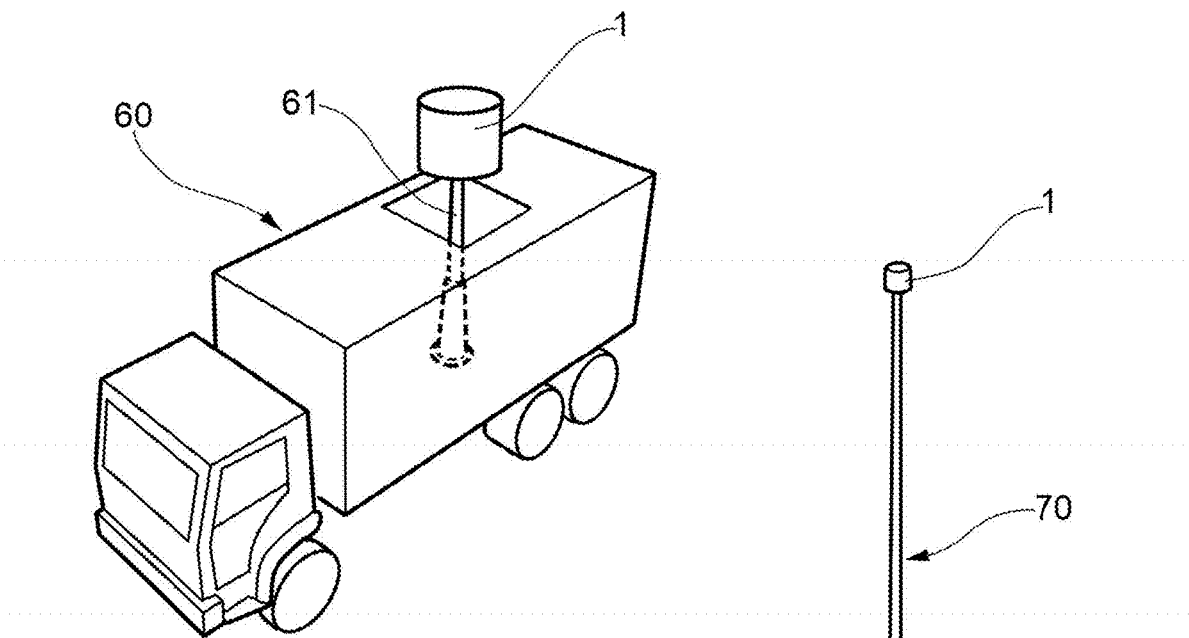
FIG. 8 shows a land vehicle comprising the radar system of FIGS. 1 and 2.

With reference to FIG. 8, it is worth noting that a radar system 1 of the type described above may be installed on board a land vehicle 60, for example at the top of a telescopic shaft 61. In the particular example depicted, the aforesaid land vehicle 60 is a truck provided with a livable container housing a command and control console and possibly the other hardware/software apparatuses adapted to process signals associated with the operation of the radar system 1.

Figure 9:
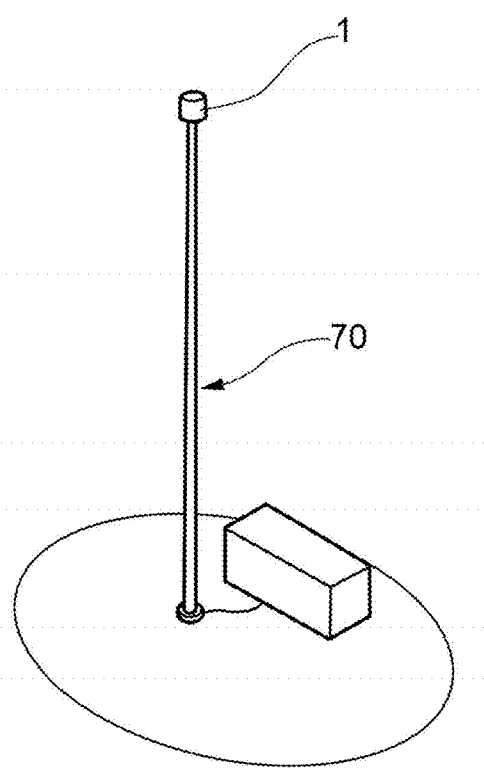
FIG. 9 a land surveillance system comprising the radar system of FIGS. 1 and 2.

Finally, FIG. 9 shows a further possible application in which the radar system 1 is fixed to the ground or to a building, for example at the top of a support pole 70.

The radar system proposed indeed is relatively less complex and less costly and may easily be made in a modular fashion since many parts are similar to one another. Moreover, as can be inferred from FIGS. 5 and 6, the uniformity of the performances in the azimuthal plane is surprising.

The principle of the disclosure being understood, the embodiments and manufacturing details may largely vary with respect to what has been described and illustrated by mere way of non-limiting example, without hereby departing from the scope of the disclosure as defined in the appended claims.

The invention claimed is:

1. A radar system comprising:
   a transmitting antenna comprising a plurality of linear arrays of transmitting antenna elements arranged on a generatrix of a truncated cone or on a cylindrical surface;
   a signal generator block operatively connected to the transmitting antenna and adapted to feed the transmitting antenna;
   a receiving antenna comprising a plurality of groups of linear arrays of receiving antenna elements arranged on the generatrix of the truncated cone or on the cylindrical surface, wherein each group of linear arrays of receiving antenna elements is circumferentially interposed between a first and a second linear arrays of transmitting antenna elements; and
   a signal processor operatively connected to the receiving antenna;
   wherein the signal generator block is adapted and configured to feed the transmitting antenna so that the first linear array of transmitting antenna elements only emits a first electromagnetic radiation at a first frequency and the second linear arrays of transmitting antenna elements only emits a second electromagnetic radiation at a second frequency, wherein the first frequency is different from the second frequency;
   wherein the signal processor comprises a full digital beamforming block adapted and configured to digitally synthesize a plurality of simultaneous and independent receiving beams;
   wherein each receiving beam is synthesized by processing signals provided by a plurality of linear arrays of receiving antenna elements consecutive to one another; and
   wherein for at least one of said receiving beams the linear arrays consecutive to one another belong to two distinct groups of linear arrays of the receiving antenna.

2. A radar system according to claim 1, wherein the transmitting antenna has four linear arrays of transmitting antenna elements oriented two by two along opposite directions and arranged in an opposite position from one another.

3. A radar system according to claim 2, wherein the linear arrays of transmitting antenna elements which are arranged in opposite positions emit electromagnetic radiations at a same frequency.

4. A radar system according to claim 3, wherein the linear arrays of transmitting antenna elements are angularly spaced by 90°.

5. A radar system according to claim 1, wherein the linear arrays of the receiving antenna are adapted and configured to receive radar echo signals resulting from the reflection on a target of both said first and said second electromagnetic radiations and wherein the radar echo signal processor is adapted and configured:
   to sample said received radar echo signals to obtain digital signals;
   to carry out a digital filtering which allows extracting from said digital signals a set of digital samples containing information related to pulses transmitted by the first linear array of transmitting antenna elements and a set of digital samples containing information related to pulses transmitted by the second linear array of transmitting antenna elements.

6. A radar system according to claim 5, wherein the linear arrays of the receiving antenna comprise a frequency down-conversion module adapted to convert said received radar echo signals into intermediate frequency analog signals, wherein said digital processing module is such to sample said intermediate frequency analog signals.

7. A radar system according to claim 1, wherein the number of linear arrays of the receiving antenna is much greater than the number of linear arrays of the transmitting antenna.

8. A radar system according to claim 1, wherein the first and the second electromagnetic radiation are emitted simultaneously.

9. A vessel comprising at least one radar system according to claim 1.

10. A land vehicle comprising at least one radar system according to claim 1.

11. A radar system according to claim 1, wherein each group of linear arrays of receiving antenna elements is axially aligned to the first and a second linear arrays of the transmitting antenna elements.

12. A radar system according to claim 1, wherein said first frequency and said second frequency are spaced apart from each other by a distance ranging between 5 MHz and 15 MHz.

* * * * *